United States Patent [19]

Dunham et al.

[11] Patent Number: 5,092,610
[45] Date of Patent: Mar. 3, 1992

[54] HIGH PRESSURE PISTON SEAL

[75] Inventors: Lawrence A. Dunham, Northridge; Arthur E. Vasquez, Winnetka, both of Calif.

[73] Assignee: ITT Corporation, New York, N.Y.

[21] Appl. No.: 613,596

[22] Filed: Nov. 15, 1990

[51] Int. Cl.⁵ .................................. F16J 9/06
[52] U.S. Cl. ................... 277/27; 277/165; 277/176
[58] Field of Search ............. 277/27, 165, 176, 177, 277/206 R

[56] References Cited

U.S. PATENT DOCUMENTS

| | | | |
|---|---|---|---|
| 2,968,501 | 1/1961 | Tisch | 277/177 |
| 3,268,235 | 8/1966 | Jacobellis et al. | 277/165 |
| 3,418,001 | 12/1968 | Rentschler et al. | 277/165 |
| 3,494,624 | 2/1970 | Woodling | 277/165 |
| 3,698,728 | 10/1972 | Walker | 277/165 |
| 3,727,925 | 4/1973 | Jones | 277/165 |
| 4,101,140 | 7/1978 | Reid | 277/165 |
| 4,151,999 | 5/1979 | Ringel et al. | 277/165 |
| 4,235,447 | 11/1980 | Davison | 277/208 |
| 4,523,765 | 6/1985 | Heidmann | 277/165 |
| 4,566,703 | 1/1986 | Zitting | 277/165 |
| 4,702,482 | 10/1987 | Oseman | 277/165 |
| 4,709,932 | 12/1987 | Edlund et al. | 277/165 |
| 4,917,390 | 4/1990 | Lee et al. | 277/165 |
| 4,953,876 | 9/1990 | Müller | 277/165 |

*Primary Examiner*—William A. Cuchlinski, Jr.
*Assistant Examiner*—Daniel G. DePumpo
*Attorney, Agent, or Firm*—Menotti J. Lombardi

[57] ABSTRACT

A high pressure piston seal with low pressure seal capabilities. At high pressure the seal configuration increases the footprint loading for high pressure sealing. The seal arrangement also provides a labyrinth effect at low pressure combined with reduced loading.

3 Claims, 1 Drawing Sheet

HIGH PRESSURE PISTON SEAL

BACKGROUND OF THE INVENTION

This invention relates to high pressure piston seals and more particularly to a high pressure piston seal with low pressure sealing capability.

It is known to seal dynamic pistons with standard O-rings to provide sealing, however, friction and wear are typically less than desired. Energized cap seals are used to prevent wear, but unless lightly loaded, do not significantly reduce friction. Teflon seals sacrifice low pressure (0–100 psi) sealing to provide high pressure (2000–4000 psi) sealing.

U.S. Pat. No. 4,101,140 provides a seal ring with finely grooved sealing surfaces which are roll-formed on the ring, and responses to force entrained fluid from the grooves.

U.S. Pat. No. 4,566,703 seal arrangement has multi-lobes intended to retain lubrication without being pressure responsive.

U.S. Pat. No. 4,235,447 provides a metallic seal with annular ridges intended for internal combustion engines.

U.S. Pat. No, 3,727,925 shows a cap type seal arrangement designed to deal with reversing pressure direction without pressure responsiveness.

U.S. Pat. No, 3,494,624 provides a seal designed to lubricate a dry shaft and reduce heat build-up without being pressure responsive.

U.S. Pat. No. 3,418,001 illustrates a seal design to prevent seal failure due to twisting, scrubbing or spiraling without pressure responsiveness.

U.S. Pat. No. 3,268,235 shows a seal design with machined grooves without being pressure responsive.

U.S. Pat. No. 2,968,501 is a seal design for pressure reversal and reduced wear without pressure responsiveness.

The foregoing and most known devices use the same seal "foot print" at all pressures from low to high. Some seals have grooves which are machined in their sealing surface to provide a labyrinth effect, but are costly to produce. Shortcomings are typically high loading and high friction for low pressure sealing, or low loading and low pressure leakage for low friction high pressure sealing.

Accordingly, the problem of high pressure piston sealing with low pressure sealing is accomplished according to the invention.

SUMMARY OF THE INVENTION

An object of the invention is to provide a high pressure piston seal with low pressure sealing capabilities.

The seal according to the invention presents a variable "footprint" which is a function of the pressure. The seal also provides a labyrinth effect at low pressure combined with reduced loading. At high pressure the seal increases the footprint and loading for high pressure sealing.

BRIEF DESCRIPTION OF THE DRAWINGS

Other objects and advantages of the invention will become more fully apparent from the following detailed description of the preferred embodiment, the appended claims and the accompanying drawings in which:

DETAILED DESCRIPTION OF THE PREFERRED EMBODIMENT

Figure 1:
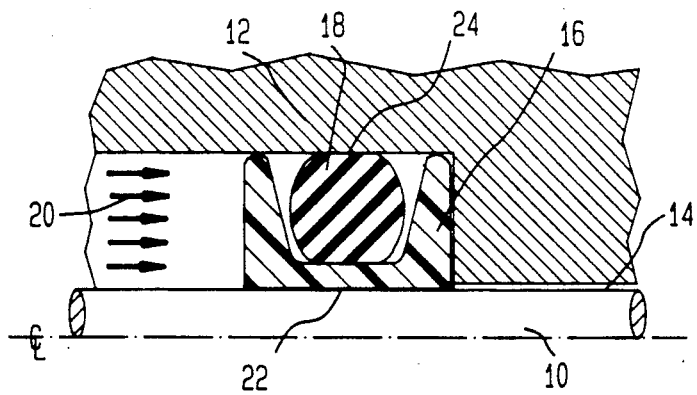
FIG. 1 is a typical teflon seal according to the prior art.

Referring to FIG. 1, there is shown a typical Teflon type seal according to the prior art. A piston 10 reciprocates in a pressure retaining cylindrical member 12, with a clearance 14 therebetween. A U-shaped ring seal 16 of Teflon or the like has a plastic elastomer O-ring 18 in its groove which combine to seal the clearance against the fluid pressure indicated by arrows 20. The prior art combination, creates a single seal line along points 22,24 by virtue of the squeezing of O-ring 18 between the cylinder 12 and the groove bottom of the U-shaped seal.

Figure 2:
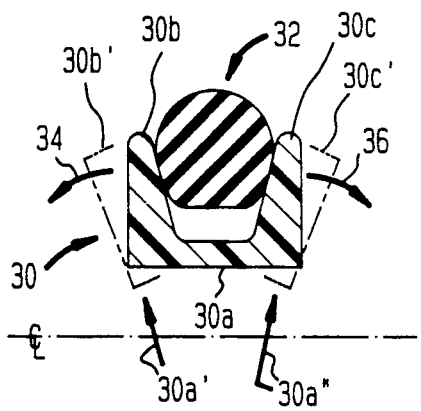
FIG. 2 is a seal arrangement according to the invention.

Referring now to FIG. 2, the principle of the invention is illustrated. The U-shaped ring seal member 30, has a base portion 30a, and leg portions 30b,c. The seal material is preferably teflon (virgin or with a filler of moly or graphite or the like), but other plastics such as nylon, Delrin, Lexan and the like are acceptable. An elastomer O-ring 32 has a diameter which is greater than the normal internal spacing between the leg portions 30b,c. The width of the groove of the U-shaped member is about 75% of the O-ring cross-sectional diameter. (A typical 0.070" diameter O-ring would require a groove width of about 0.0525"). When the O-ring is inserted in the groove of the U-shaped member 30, the legs are forced outward as indicated by arrows 34,36 causing legs 30b,c to move to positions indicated in dashed lines 30b',30c'. Also the end portions of the base 30a deflect outward to form line contact at points 30a',30a".

Figure 3:
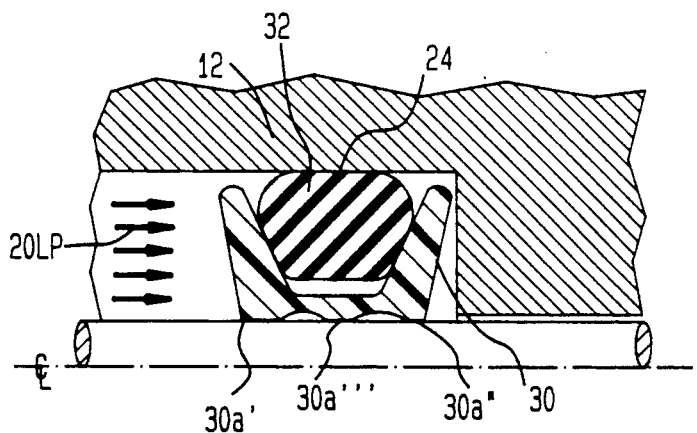
FIG. 3 shows the seal arrangement of the invention at low pressure.

FIG. 3 is a low pressure situation in which low pressure fluid is represented by arrows 20LP and the combination of FIG. 2 is placed between the cylinder pressure member 12 and the piston 10. Due to the diameter of O-ring 32, the legs of U-shaped seal 30 deflect outward to cause sealing lobes to be formed at points 30a',30a" as demonstrated in FIG. 2. Additionally, the pressure caused by member 12 on O-ring 32 at point 24 cause an additional lobe to be formed at point 30a'''. This provides triple sealing points between the piston and the seal member compared to the single point sealing of FIG. 1 without the need for machining or special fabrication of the seal member. There should be a slight inference between seal 30 and piston 10 to effect good sealing arrangement, and member 12 should compress O-ring 32 about 20%.

Figure 4:
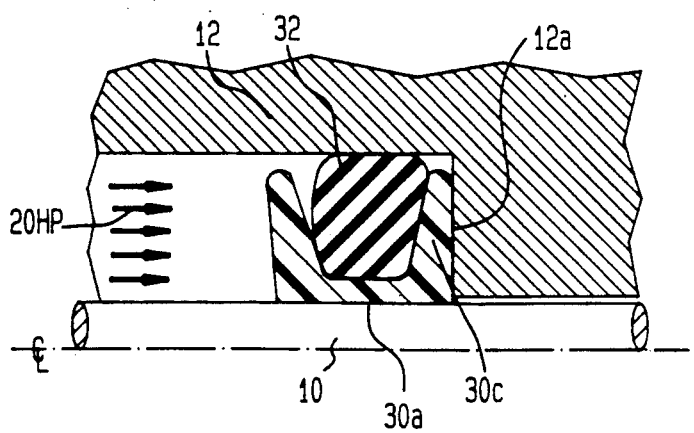
FIG. 4 shows the seal arrangement of the invention at high pressure.

FIG. 4 illustrates the effect on the U-shaped seal 30 and O-ring 32 of FIG. 3 when subjected to a high pressure fluid indicated by arrows 20HP. The pressures cause the O-ring to elongate which presses the leg 30c against the cylinder end wall 12a. The high pressure also eliminates lobes 30a',30a",30a''' and causes a single sealing surface 30a to be formed.

As can be seen, the unique combination of U-shaped seal and O-ring is effective at both low and high fluid pressures. At low pressure the seal provides the labyrinth effect combined with reduced loading for low friction sealing. At high pressure, the seal increases the footprint and loading for high pressure sealing.

While the present invention has been disclosed in connection with a preferred embodiment thereof, it should be understood that there may be other embodiments which fall within the spirit and scope of the invention as defined by the following claims.

What is claimed is:

1. In a pressure retaining cylinder having a reciprocating piston therein, seal means to seal the clearance between said member and piston against fluids at high and low pressures comprising in combination:

a ring seal having a generally U-shaped cross-sectional configuration and a uniform inner ring surface for sliding engagement with said piston;

an O-ring being mounted between the interior surface of said cylinder and the interior legs and bottom of said U-shaped seal; and said O-ring having a cross-sectional diameter greater than the interior width between said legs of said U-shaped seal, the width being about 75% of the diameter, and said O-ring being compressed about 20% by said interior surface of said cylinder whereby at low pressure up to about 100 psi, multiple sealing points are formed in said surface between said ring seal and piston, and at high pressure in the range of 2000 to 4000 psi a single sealing surface is formed by said surface between said ring seal and piston.

2. A high pressure piston seal arrangement with low pressure sealing capability in the range of 0 to about 100 psi, the arrangement comprising in combination:

a pressure retaining cylinder portion having an interior surface and an end wall perpendicular to said interior surface with a cylindrical opening with a diameter less than said interior surface of said cylinder portion;

a piston portion reciprocally movable in said cylindrical opening and having a clearance therebetween to be fluid sealed at high and low pressures;

a plastic U-shaped ring seal having a uniform inner ring surface for sliding engagement with said piston portion, and said ring seal being positioned adjacent the interior surface of said end wall in the space formed by said piston portion and said interior surface of said cylinder portion;

an elastomeric O-ring being mounted between the interior legs and bottom of said U-shaped ring seal and the interior surface of said cylinder portion; and said O-ring having a cross-sectional diameter greater than the interior width between the legs of said U-shaped ring seal, said width being about 75% of said diameter, and said O-ring being compressed about 20% between the interior surface of said cylinder portion and the interior legs and bottom of said U-shaped seal, such that at low fluid pressure triple sealing points are formed in said surface between said inner ring surface and said piston portion and that at high fluid pressure in the range of 2000 to 4000 psi a single sealing surface is formed by said surface between said inner ring surface and said piston portion.

3. A high pressure piston seal arrangement for sealing in the range of 2000 to 4000 psi and for low pressure sealing in the range up to about 100 psi, the arrangement comprising in combination:

a pressure retaining cylinder portion having an interior surface and an end wall perpendicular to said interior surface with a cylindrical opening with a diameter less than said interior surface of said cylinder portion;

a piston portion reciprocally movable in said cylindrical opening and having a clearance therebetween to be fluid sealed at high and low pressures;

a plastic U-shaped ring seal having a uniform inner ring surface for sliding engagement with said piston portion, and said ring seal being positioned adjacent the interior surface of said end wall in the space formed by said piston portion and said interior surface of said cylinder portion;

an elastomeric O-ring being mounted between the interior legs and bottom of said U-shaped ring seal and the interior surface of said cylinder portion; and said O-ring having a cross-sectional diameter greater than the interior width between the legs of said U-shaped ring seal, said width being about 75% of said diameter, and said O-ring being compressed about 20% between the interior surface of said cylinder portion and the interior legs and bottom of said U-shaped seal, such that at low fluid pressure triple sealing points are formed in said surface between said inner ring surface and said piston portion and that at high fluid pressure a single sealing surface is formed by said surface between said inner ring surface and said piston portion.

* * * * *